United States Patent Office 3,419,527
Patented Dec. 31, 1968

3,419,527
METHOD OF PREPARING PHENOLFORMALDE-HYDE RESINS EMPLOYING AN ORGANIC SOLVENT TO DISSOLVE THE PHENOL
Modest Sergeevich Akutin, Lena Anastasievna Rodivilova, and Svetlana Lvovna Gershkokhen Moscow, U.S.S.R., assignors to Gosudarstveny Nauchno-Issledovatelsky Institute Plasticheskikh mass, Moscow, U.S.S.R.
No Drawing. Filed Jan. 29, 1965, Ser. No. 429,159
3 Claims. (Cl. 260—57)

ABSTRACT OF THE DISCLOSURE

A method of preparing a quick-hardening, novolac-type phenolformaldehyde resin in the presence of a hydrochloric acid catalyst. The formaldehyde and hydrochloric acid catalyst in a water solution are added to the phenol in an organic solvent solution. The reaction is preferably performed at 70–80° C. and goes to completion in a relatively short period of time. The resin precipitates and is separated from the solvents and dried. The resulting resin has a low free-phenol content and a high hardening rate. Molding compositions based on the resulting resin also have increased thermal stability.

---

The present invention relates to a method of preparing phenol-formaldehyde resins, more particularly to novolac type phenol-formaldehyde resins.

It is known that the widely used phenol-formaldehyde resins of the novolac type are prepared by the polycondensation of phenol with formaldehyde in a homogeneous medium in the presence of acid catalysts, preferably hydrochloric acid.

The polycondensation process takes place at a temperature of 70–80° C. for a period of 3 to 3.5 hours and is dependent on the degree of precision with which the ratio of the reactants is being observed, as well as on the temperature conditions.

The disadvantages of this process are its batch character which adversely affects the quality of the final product, the long duration of the production cycle, the high degree of polydispersion of the final phenol-formaldehyde resins and their low setting rate.

It is an object of the present invention to provide a continuous process for the preparation of phenol-formaldehyde resins.

Another object of this invention is to reduce the time of the resin production cycle.

A further object of this invention is to provide a process which makes it possible to obtain quick-setting phenol-formaldehyde resins.

In accordance with the foregoing objects, the method of the present invention consists in carrying out the polycondensation of phenol with formaldehyde in an immiscible solvent system which comprises water and an organic solvent.

To the organic phase containing 4 to 6 moles of phenol per liter there is added the water phase containing formaldehyde in the amount of 2 to 3 moles per liter and 13–18% of hydrochloric acid. Suitable organic solvents are benzene, toluene, carbon tetrachloride tetrachloroethane, dichloroethane or white spirit. The above-mentioned process is carried out preferably at a temperature of 70–80° C. The resin that precipitates is separated from the mixture of water and an organic solvent and dried under vacuum until the water is completely removed.

The present method makes it possible to shorten the polycondensation period of the process from 3–3.5 hours to 10–15 minutes, to employ a continuous process for the production of phenol-formaldehyde resins, to decrease the content of free phenol in the supernatant liquor and in the finished resin. The setting rate of the proposed resins and of the molding powders prepared from them is 1.5 to 2 times higher than that of the conventional resins, which affords the possibility of increasing the lift of molded articles.

The thermal stability of the molded articles increases by 40–50° C.

In order that those skilled in the art may better understand the invention, the following examples are given by way of illustration.

Example 1

Into a four-necked flask with a capacity of 0.5 to 1.0 liter, provided with a thermometer, a reflux condenser, and a dropping funnel there is charged 66.5 ml. of organic solvent (toluene) containing 25 g. of phenol. The solution is heated to 70° C., after which there is added from the dropping funnel 110 ml. of an aqueous solution containing 6.6 g. of formaldehyde and 22.5 g. of hydrochloric acid. The reaction mixture is kept at a temperature of 70±5° C. for a period of 10–15 minutes, then the precipitated resin is separated from the mixture of organic and water phases and submitted to drying in a Wurtz flask at a temperature of 100–140° C. and a residual pressure of 400–500 mm. of Hg.

Characteristics of the resins obtained:

Yield _____ percent__ 100–105
Specific viscosity of a 10% solution of the resin
  in alcohol _____ 0.73
Phenol _____ percent__ 2–2.5
Setting time _____ sec__ 30–40

Example 2

The polycondensation of phenol with formaldehyde is carried out using the proportion of reagents and procedure given in Example 1, but keeping the temperature at 20±5° C.

Stirring of the reaction mixture at a temperature of 20° C. is continued for 40 minutes. The drying of the resin is carried out in the same way as in Example 1.

Characteristics of the resins obtained:

Yield _____ percent__ 90–100
Specific viscosity of a 10% solution of the resin
  in alcohol _____ 0.63
Content of free phenol _____ percent__ 2–1.5
Setting time _____ sec__ 35–40

Example 3

Into a four-necked flask is charged 133 ml. of organic solvent (carbon tetrachloride) containing 25 g. of phenol. The solution is heated to 70° C., after which there is gradually added over a period 3 to 5 minutes 220 ml. of an aqueous phase which contains 6.6 g. of formaldehyde and 45 g. of hydrochloric acid. The reaction mixture is stirred for 20 minutes.

The drying of the resin is carried out as in Example 1.
Characteristics of the resins obtained:

Yield _____ percent__ 80–94
Specific viscosity of a 10% of resin in alcohol __ 0.56
Content of free phenol _____ percent__ 3–4
Setting time _____ sec__ 40

What we claim is:
1. A method of preparing novalak-type phenol-formaldehyde resins by effecting the polycondensation of phenol with formaldehyde, comprising mixing a water solution of 2–3 moles per liter formaldehyde and 13–18% by weight hydrochloric acid with an organic solvent solution of 4–6 moles per liter phenol wherein said organic solvent is a member of the group consisting of benzene, toluene, carbon tetrachloride, tetrachloroethane, dichloroethane and white spirit, and recovering the precipitated resin from the mixture of water and organic solvent.

2. A method as defined in claim 1 wherein said polycondensation is performed at a temperature of 70–80° C.

3. A method as defined in claim 1, further comprising drying said resin at reduced pressure.

References Cited

UNITED STATES PATENTS

| | | | |
|---|---|---|---|
| 1,156,452 | 10/1915 | Baekeland | 260—57 |
| 1,873,105 | 8/1932 | Bhagwat | 260—57 |
| 2,097,109 | 10/1937 | Sutter | 260—3 |
| 2,198,318 | 4/1940 | Sachanen et al. | 260—43 |
| 2,411,557 | 11/1946 | Schuh | 260—57 |

OTHER REFERENCES

Phenolic Resins, Gould, 1959, p. 28.

WILLIAM H. SHORT, *Primary Examiner.*

H. E. SCHAIN, *Assistant Examiner.*

U.S. Cl. X.R.

260—95